UNITED STATES PATENT OFFICE.

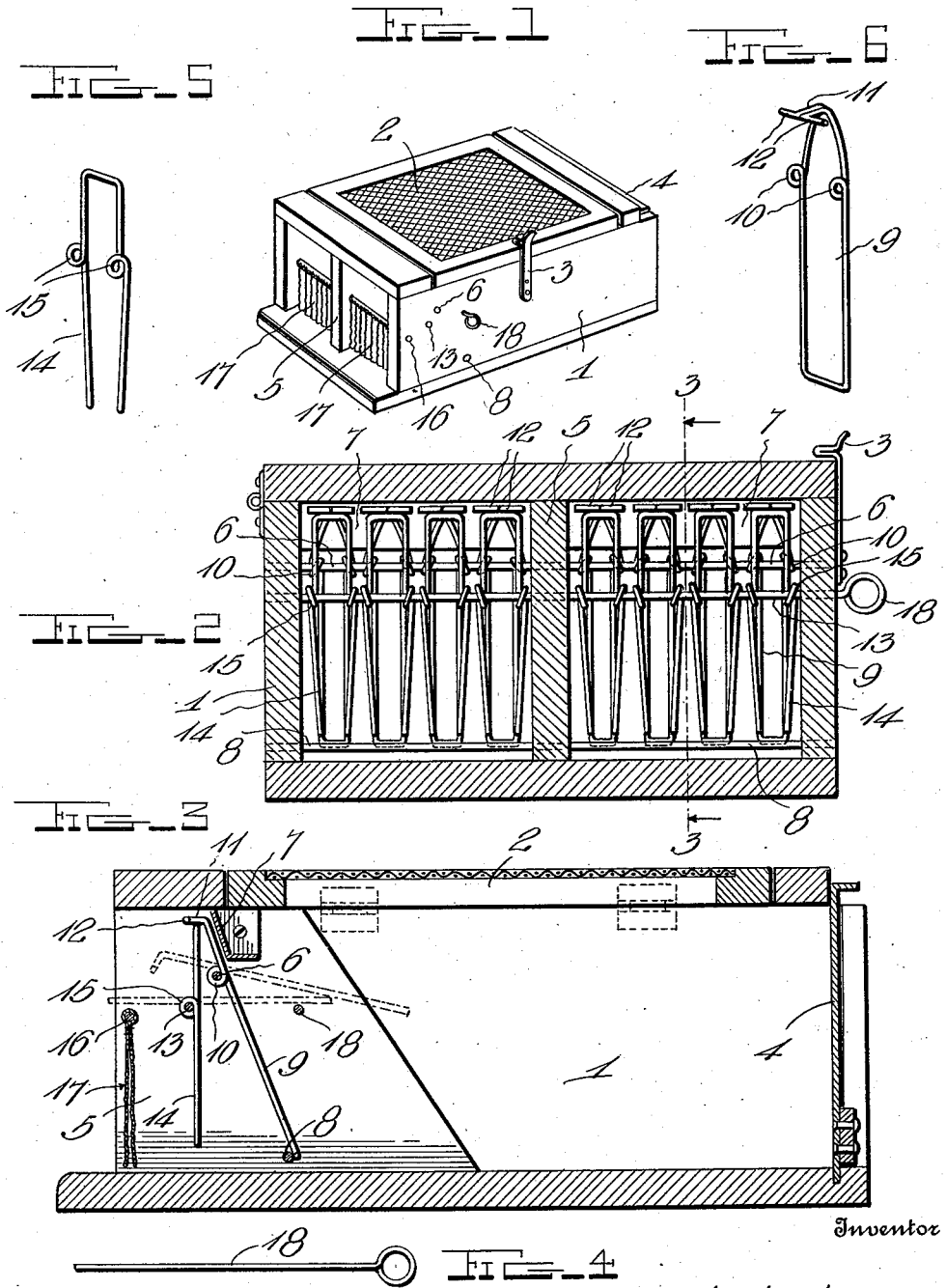

RICHARD H. HARRIS, OF CULPEPER, VIRGINIA, ASSIGNOR OF ONE-HALF TO WILLIAM T. BYRAM, OF WASHINGTON, DISTRICT OF COLUMBIA.

TRAP.

1,010,256.  Specification of Letters Patent.  Patented Nov. 28, 1911.

Application filed May 31, 1911. Serial No. 630,434.

*To all whom it may concern:*

Be it known that I, RICHARD H. HARRIS, a citizen of the United States, residing at Culpeper, in the county of Culpeper and State of Virginia, have invented certain new and useful Improvements in Traps, of which the following is a specification.

This invention has relation to traps, especially adapted to be used for capturing mice, rats and similar small animals, and has for its object to provide a structure in which the entrance passageways are controlled by two distinct sets of coöperating wickets so arranged that an animal may readily pass into the trap, but when once in is positively and effectually prevented from making an escape.

A further object of the invention is to provide at the entrance passageways of the trap blinds so positioned as to conceal the barriers constituting the wickets and which prevent the escape of the animal when once within the trap. This blind is made of flexible material in the form of pendent strips and also serves as means for preventing the head and the forward portion of the animal from coming in contact with the wickets as the animal enters the trap, thus serving as means for allaying suspicion on the part of the animal and preventing it from exercising extreme caution in entering the trap.

In the accompanying drawing: Figure 1, is a perspective view. Fig. 2, is a vertical transverse section on an enlarged scale taken immediately in front of and looking toward the wickets. Fig. 3, is a vertical longitudinal section on line 3—3 of Fig. 2, dotted lines indicating the position of the wickets out of operative position. Fig. 4, is a detail elevation of the rod for keeping the wickets out of operative position. Figs. 5 and 6 are views in perspective of the coöperating wickets.

Corresponding and like parts are referred to in the following description and indicated in all the views of the accompanying drawing by the same reference characters.

The trap consists of a pound 1 the sides and bottom of which are preferably constructed of solid material, while the top 2 is of woven wire or other open work material. The said top is hinged at one edge to one of the sides of the pound and at its other edge portion lies over the opposite edge of the pound and is held by a securing device 3. The said top may be swung back at will for the purpose of baiting the trap. The back of the pound is formed by a metallic section 4 which is vertically slidable and which may be removed when it is desired to empty the pound of the trapped animals. A partition 5 is provided at the forward portion of the pound and is approximately midway between the sides thereof and parallel with the said sides. At its inner end the partition 5 terminates short of the back or metallic section 4 of the pound for a purpose which will be explained hereinafter.

The space between the partition 5 and the sides of the pound 1 constitutes entrance passageways to the interior of the said pound. A rod 6 passes transversely through the upper portions of the sides of the pound 1 and the upper portion of the partition 5, and abutment plates 7 extend transversely across the said entrance passageways from the partition to the sides of the pound 1 and are located slightly above and slightly behind the rod 6. An abutment rod 8 passes through the lower portions of the sides of the pound 1 and the lower portion of the partition 5 and is located behind the abutment plates 7.

Barrier members 9 are pivotally mounted upon the rod 6 and are arranged in gangs, a gang being located in each of the passageways between the partition and the sides of the pound 1. These barrier members are of such a length that their lower portions normally rest against the inner side of the abutment rod 8 and their upper portions are in close proximity to the forward sides of the plates 7, the said plates being located in the paths of movement of the upper portions of the said barrier members and serve as means for preventing the upper portions of the said members from swinging inwardly. At their lower portions the said barrier members are free to swing inwardly, but are restrained against forward or outward swinging movement by the abutment rod 8. Therefore the said barrier members are normally held in inclined positions. These members are preferably formed from wire having approximately parallel side portions provided with loops 10 which loosely receive the rod 6, whereby the said loops serve as means for pivotally or hingedly supporting the said barrier members. At the upper ends of the said barrier members the side rods are brought together and extended forwardly in the form of a shank 11 from which the ends of the rods are extended laterally away from each other and constituting lugs 12.

A rod 13 passes transversely through the sides of the pound 1 and also through the partition 5 at the upper portions thereof but is located in front of and below the rod 6. Locking wickets 14 are pivotally or hingedly mounted upon the rod 13 and are so weighted that they will normally hang in approximately vertical positions with relation to the rod 13. These locking wickets are also made from sections of wire or rod having parallel side portions provided with loops 15 which loosely receive the rod 13 and serve as hinges. The portions of the locking wickets 14 from the rod 13 to their upper ends are of a length to fit snugly at their upper ends under the shanks 11 of the barrier members 9, and thus when the locking wickets are in vertical positions they prevent the upper ends of the barrier members 9 from swinging forwardly as the said shanks will engage the upper ends of the locking wickets when an attempt is made to swing them in a forward direction. The lower ends of the locking wickets 14 terminate short of the bottom or floor of the pound 1. A rod 16 passes through the forward end portions of the sides of the pound 1 and the forward end portion of the partition 5, and at each passageway between the sides of the pound supports a blind 17. These blinds are made of cloth or other similar flexible material cut in strips which hang pendent from the supporting rod 16, and the said strips terminate at or about the upper surface of the bottom or floor of the pound 1.

A rod 18 is adapted to be passed through one of the sides of the pound 1 and the partition 5 and may serve as means for holding the lower ends of the locking wickets 14 and the barrier members 9 in elevated positions when their lower end portions are swung inwardly. When this rod is removed the said wickets and barrier members are free to swing down at their lower end portions to the extent as has been hereinbefore indicated.

In the operation of the trap it is preferable to use the same initially as a ruse for the purpose of giving the animals the impression that it is a source of food free for them to plunder. To accomplish this the lower end portions of one of the sets of barrier members 9 and the lower end portions of the locking wickets 14 in the same passageway are swung upwardly and inwardly. The rod 18 is then inserted through the side of the pound and the partition 5 under the ends of the parts thus swung up and the inner ends of the said parts are thus held in elevated positions with relation to the floor of the pound 1. Bits of food are then placed in the said pound. Thus the animals may have free ingress into and exit from the pound and they will become used to entering the same securing the food and making egress in safety. When this has been permitted to continue for a desired length of time the rod 18 is removed and the parts 9 and 14 are permitted to assume their normal positions when the trap is ready to perform its function as a place of confinement. The animals having acquired the habit of entering the trap will not hesitate to enter the same when the lower portion of the barrier members 9 and locking wickets 14 are in their lowermost positions. They will first push through the strips of the blind 17 and the said strips will prevent the heads and forward portions of the animals from coming into direct contact with the metallic locking wickets 14 and barrier members 9, and thus the said wickets and barriers will not act as means for exciting suspicion. As the animals push the lower portions of the locking wickets 14 inwardly their upper portions are swung out from under the shanks 11 of the barrier members 9. Therefore the lower portion of the barrier members 9 are rendered free to swing inwardly and upwardly. The animal in its desire to reach the food will push the lower portions of the barrier members inwardly and upwardly and will pass by the same into the pound 1. As soon as this takes place the locking wickets 14 will attempt to assume their normal vertical positions and the upper portions thereof will come in contact with the lugs 12 formed at the upper ends of the barrier members 9. Thus the upper portions of the locking members 14 will tend to swing the upper portions of the barrier members 9 inwardly and will so do until the upper portions of the said barrier members 9 come in contact with the abutment plates 7. When this takes place the lugs 12 and shanks 11 of the barrier members 9 are carried above the upper ends of the locking wickets 14 and the upper ends of the said members 14 will pass under the said lugs and shanks and prevent the animals which have been entrapped from clawing or pulling the lower portions of the barrier members 9 upwardly and inwardly, which without the locking members the animals might do, and thereby effect escape. Therefore it will be seen that when the parts of the trap are set so that the pound will serve as a place of confinement, the barrier members are free to be swung upwardly and inwardly at their lower portions by animals entering the trap, but are positively held against such movement by the efforts of the animals that have already entered the trap. Therefore the trap is self setting and the victims are effectually prevented from escaping from the pound after they have once entered the same.

Having thus described the invention, what is claimed as new is:

1. A trap comprising a pound having an entrance passageway, a series of barrier members pivoted in the passageway, a series of locking members pivoted in the passageway and normally restraining the barrier members against swinging movement, and a blind located in front of the locking members.

2. A trap comprising a pound having an entrance passageway, a series of barrier members pivoted in the passageway, a series of locking members pivoted in the passageway, and normally restraining the barrier members against pivotal movement, and a blind located in front of the locking members and consisting of strips of pendent flexible material.

3. A trap comprising a pound having an entrance passageway, a series of barrier members pivoted in the passageway, means for holding said barrier members in inclined positions, an abutment for preventing inward swinging movement of the upper portions of the barrier members, said barrier members having at their upper ends forwardly projecting shanks which terminate in laterally and oppositely disposed lugs, a series of locking members pivotally mounted in the passageway in front of the barrier members and having upper end portions adapted to lie normally under the shanks of the barrier members and restrain the barrier members against swinging movement, the said lugs adapted to ride at the sides of the locking members as the locking members swing to approximately vertical positions, whereby the barrier members are returned to normal positions.

In testimony whereof I affix my signature in presence of two witnesses.

RICHARD H. HARRIS.

Witnesses:
R. M. PARKER,
V. K. GARDNER.

Copies of this patent may be obtained for five cents each, by addressing the "Commissioner of Patents, Washington, D. C."